United States Patent [19]
Liu

[11] Patent Number: 5,727,897
[45] Date of Patent: Mar. 17, 1998

[54] ROD MEMBER CONNECTOR FOR A FOLDING CHAIR

[76] Inventor: Lausan Chung Hsin Liu, No. 243, Chien-Kuo Rd., Hsin-Tien City, Taipei Hsien, Taiwan

[21] Appl. No.: 760,370

[22] Filed: Dec. 4, 1996

[51] Int. Cl.⁶ ............................... F16B 9/00; A47C 4/00
[52] U.S. Cl. ................ 403/205; 403/268; 403/403; 403/260; 297/40
[58] Field of Search ..................... 403/205, 403, 403/382, 231, 230, 256, 258, 260, 263, 267, 268; 297/39, 40; 292/87, DIG. 38

[56] References Cited

U.S. PATENT DOCUMENTS

| | | | |
|---|---|---|---|
| 1,261,213 | 4/1918 | Clay | 403/205 X |
| 2,083,354 | 6/1937 | Whittier | 403/382 |
| 2,649,138 | 8/1953 | Rechler | 297/39 X |
| 3,279,734 | 10/1966 | Kramer | 297/39 X |
| 4,536,026 | 8/1985 | Cornell | 297/39 |
| 4,647,241 | 3/1987 | Weber | 403/205 X |
| 4,900,076 | 2/1990 | Kolb et al. | 403/205 X |
| 5,054,848 | 10/1991 | Liu | 297/39 |
| 5,516,226 | 5/1996 | Wu | 403/205 X |
| 5,570,926 | 11/1996 | Papiernik et al. | 297/39 |

*Primary Examiner*—Kenneth J. Dorner
*Assistant Examiner*—William Miller
*Attorney, Agent, or Firm*—Bacon & Thomas

[57] ABSTRACT

A rod member connector including a coupling hole and a coupling tube adapted for holding two rod members of a folding chair at right angles, and two outward flanges raised from the periphery of the coupling hole at one side opposite to the coupling tube and defining a mouth adapted for holding a third rod member of the folding chair to secure the folding chair in the collapsed condition.

8 Claims, 5 Drawing Sheets

ROD MEMBER CONNECTOR FOR A FOLDING CHAIR

BACKGROUND OF THE INVENTION

The present invention relates to a rod member connector adapted for connecting two rod members of a folding chair at right angles, and more particularly to such a rod member connector which has two outward flanges raised from the periphery and defining a mouth adapted for holding a third rod member of the folding chair to secure the folding chair in the collapsed condition.

Conventional folding chairs are commonly made from wooden material. Because these wooden folding chairs are heavy, they have been gradually abandoned. Nowadays, most folding chairs are made from metal. These metal folding chairs are commonly comprised of a folding frame structure comprised of a plurality of rod members pivotably connected together by screws and nuts, a cloth seat and a cloth back respectively fastened to the folding frame structure. The screws and nuts are also used to retain the folding chairs in the collapsed condition. However, when a folding chair is folded up and retained in the collapsed position by the screws and nuts thereof, much effort shall be employed to the rod members of the folding frame structure when to extend the folding chair into the operative position. Furthermore, the screws and nuts tend to be loosened when frequently folding the folding chair. If the screws and nuts are loosened, the folding chair will vibrate when extended out.

SUMMARY OF THE INVENTION

The present invention has been accomplished to provide a rod member connector for a folding chair which eliminates the aforesaid drawbacks. It is one object of the present invention to provide a rod member connector for a folding chair which is easy to install. It is another object of the preset invention to provide a rod member connector for a folding chair which can positively secure the folding chair in the collapsed position. According to the present invention, the rod member holds two rod members of the folding chair at right angles, having two outward flanges raised form the periphery and defining a mouth adapted for holding a third rod member of the folding chair to secure the folding chair in the collapsed condition.

DETAILED DESCRIPTION OF THE PREFERRED EMBODIMENT

Figure 1:
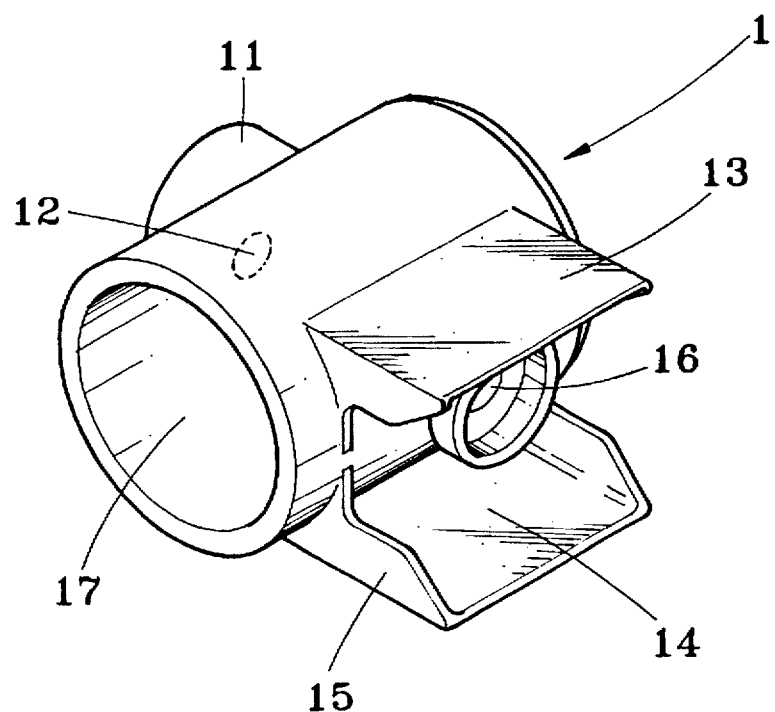
FIG. 1 is an elevational view of a rod member connector according to one embodiment of the present invention.
Figure 2:
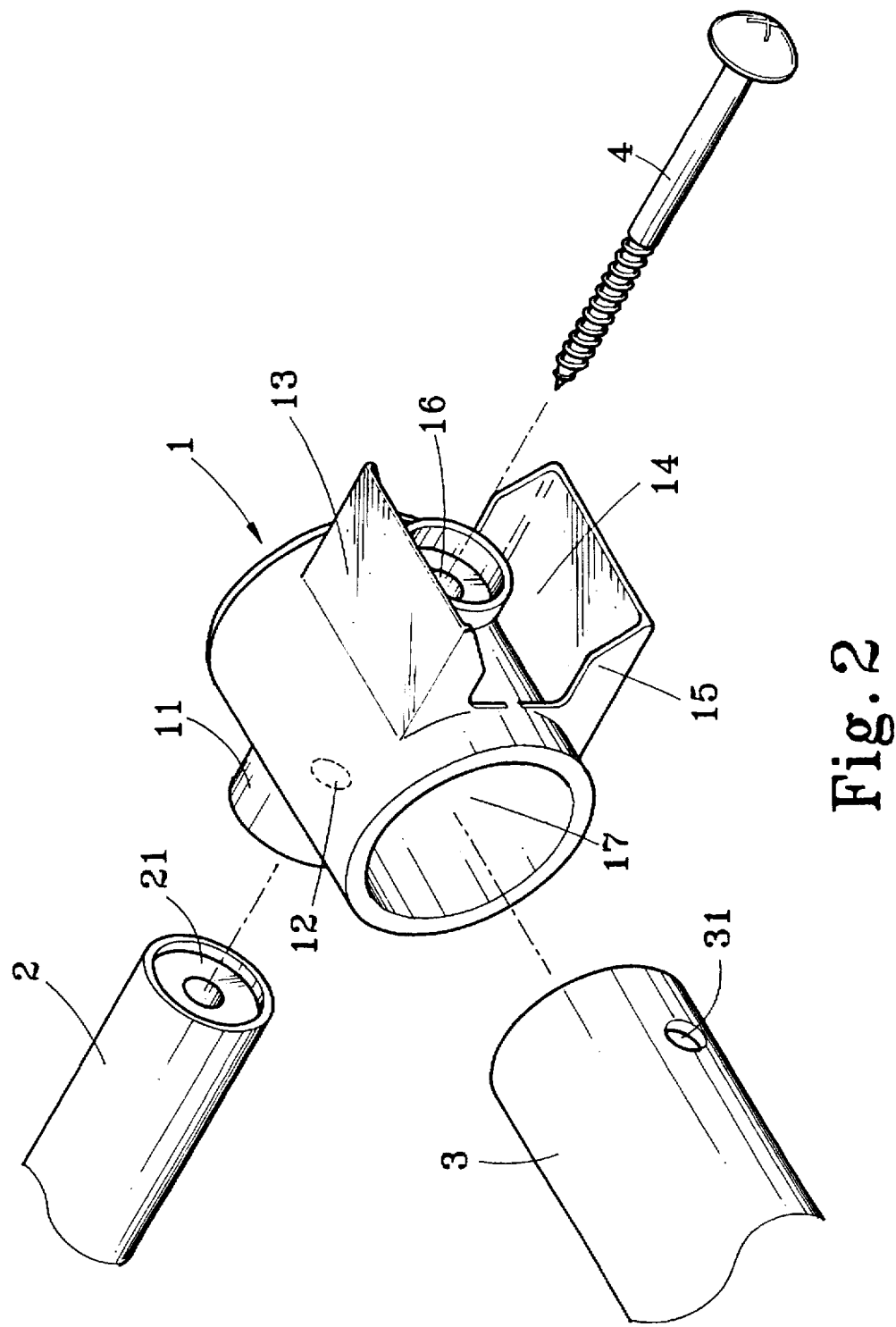
FIG. 2 is an exploded view of a rod member connector, two rod members, and a screw according to the present invention.

Referring to FIGS. 1 and 2, the rod member connector, referenced by 1, is integrally molded from rigid rubber or plastic, comprising a coupling hole 17 adapted for receiving one end of a first rod member 3 of a folding chair, a coupling tube 11 perpendicularly raised from the periphery of the coupling hole 17 at one side and adapted for receiving a second rod member 2 of the folding chair, a first through hole 12 through the periphery at one side within the coupling tube 11 and intersecting the coupling tube 17, a second through hole 16 through the periphery at an opposite side and intersecting the coupling hole 17 and in alignment with the first through hole 12, and two symmetrical outward flanges 13 perpendicularly raised from the periphery at two opposite sides of the second through hole 16 and defining a mouth 14 and guiding faces 15 adapted for guiding a third rod member 5 of the folding chair (see also FIGS. 4A and 4B) into engagement with the mouth 14.

Figure 3:
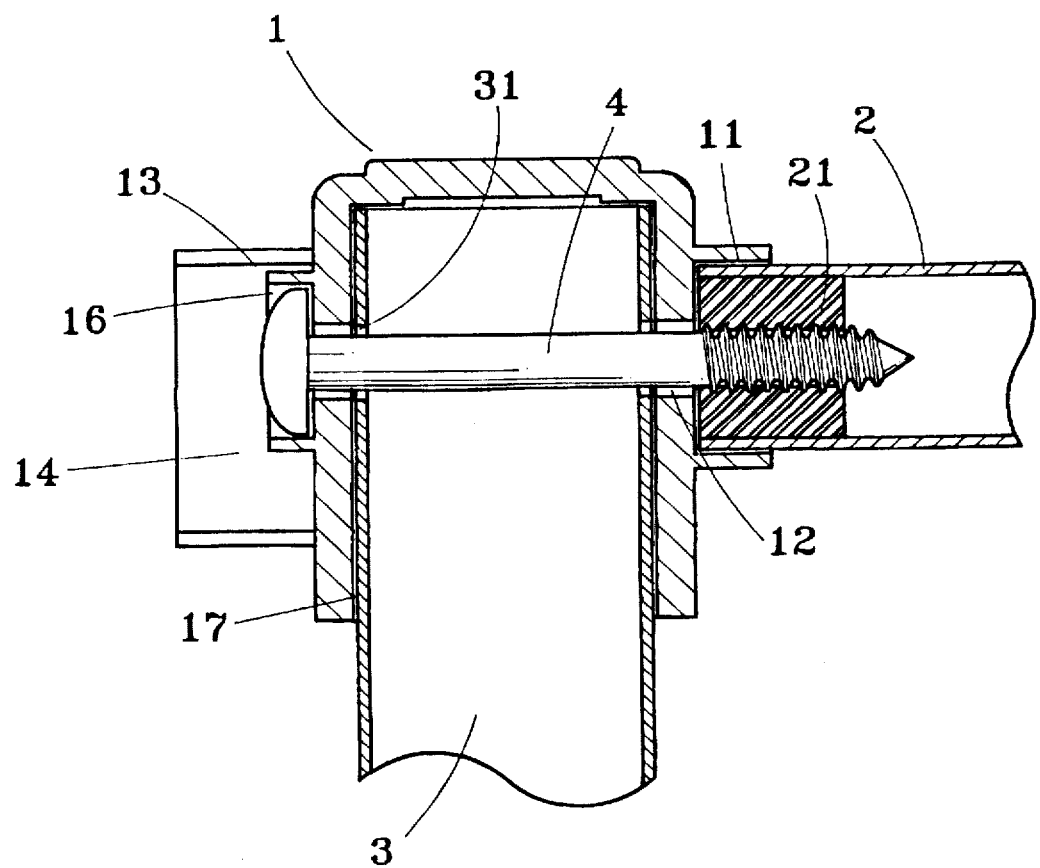
FIG. 3 is a sectional assembly view of the structure shown in FIG. 2.

Referring to FIGS. 2 and 3, the first rod member 3 and the second rod member 2 are respectively inserted into the coupling hole 17 and coupling tube 11 of the rod member connector 1, and then a screw 4 is inserted through the second through hole 16 of the rod member connector 1 and a through hole 31 at one end of the first rod member 3 and the first through hole 12 of the rod member connector 1 and then threaded into an internally threaded end member 21 at one end of the second rod member 2 to fix the rod member connector 1, the first rod member 3 and the second rod member 2 together. Furthermore, a glue may be applied to the coupling hole 17 and the coupling tube 11 to secure the first rod member 3 and the second rod member 2 in place.

Figure 4A:
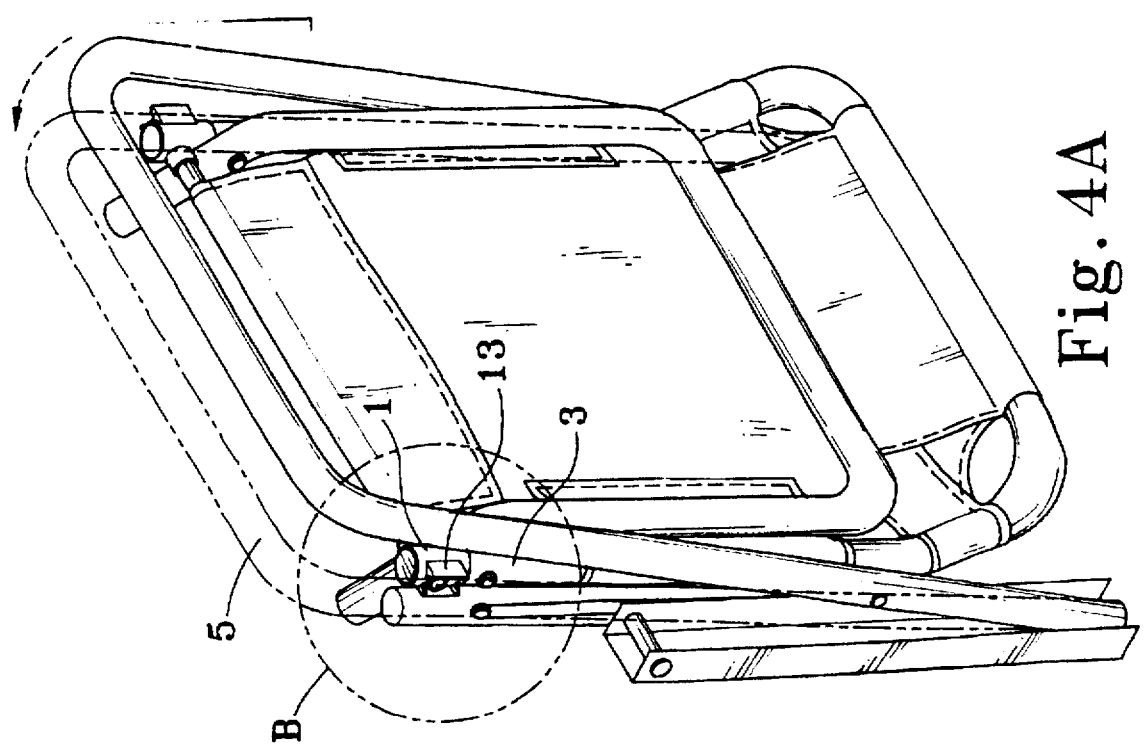
FIG. 4A is an applied view of the present invention, showing the rod member connector installed, and the folding chair folded up.
Figure 4B:
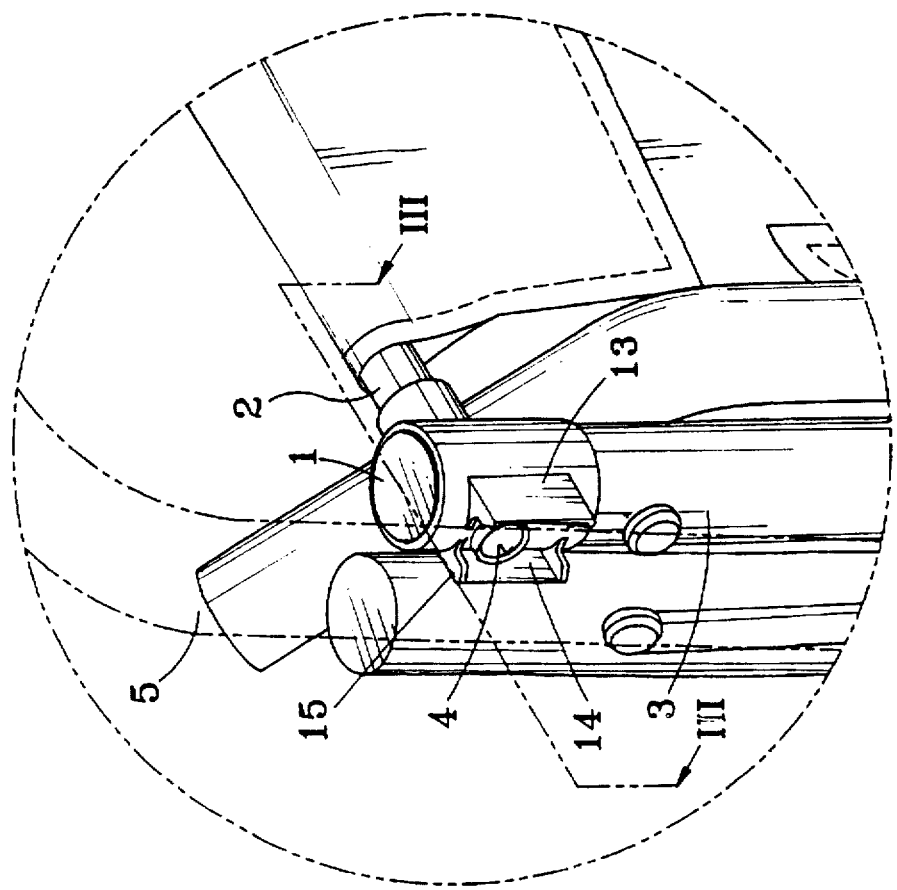
FIG. 4B is an enlarged view of area B of FIG. 4A.

Referring to FIGS. 4A and 4B, when the folding chair is folded up, the third rod member 5 is forced into engagement with the mouth 14 between the outward flanges 13, and therefore the folding chair is retained in the collapsed position.

Figure 5:
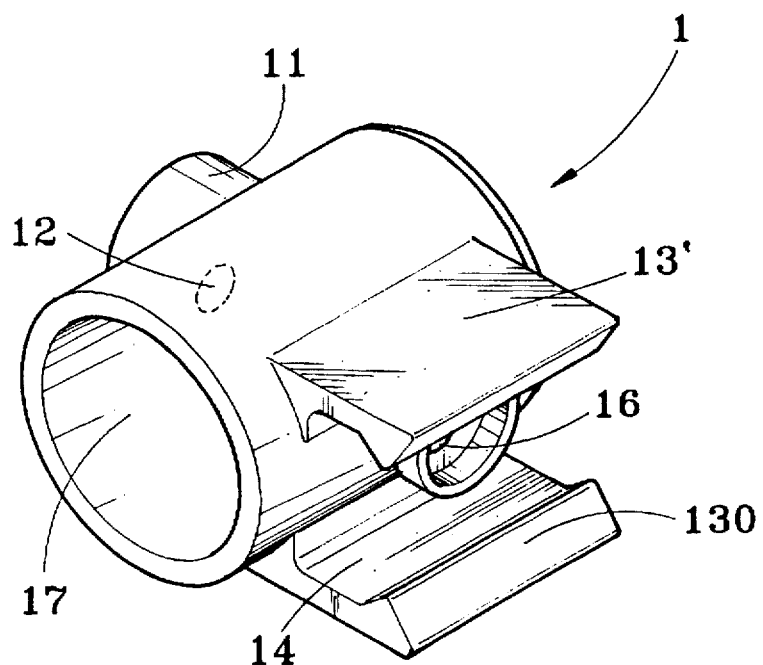
FIG. 5 is an elevational view of a rod member connector according to a second embodiment of the present invention.
Figure 6:
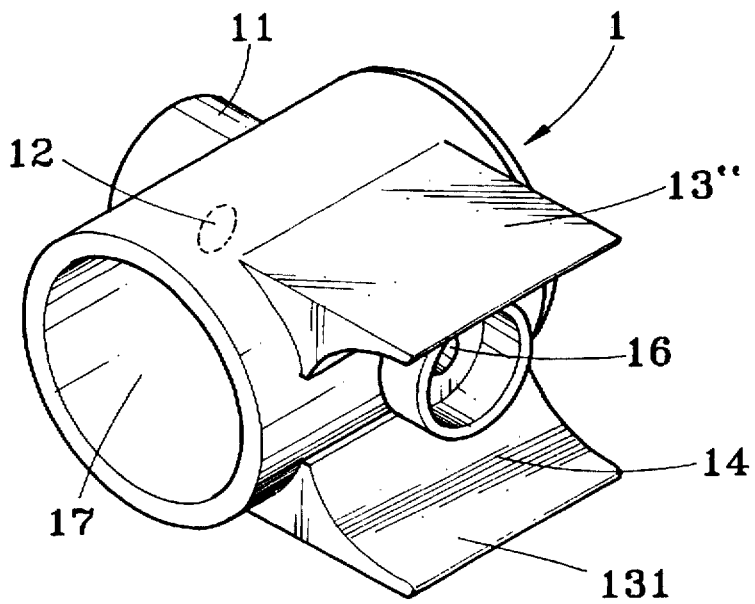
FIG. 6 is an elevational view of a rod member connector according to a third embodiment of the present invention.

FIGS. 5 and 6 show two different alternate forms of the rod member connector 1. According to the embodiment shown in FIG. 5, each outward flange 13' has a hooked outer edge 130. According to the embodiment shown in FIG. 6, each outward flange 13" has a triangular profile, and a smoothly curved inner side 131.

I claim:

1. A rod member connector comprising: a substantially cylindrical portion having opposite ends and a wall bounding a coupling hole configured to accept a first rod member therein; the cylindrical portion having a first and a second hole through the wall; a coupling tube extending outwardly from the wall between the opposite ends of the cylindrical portion at a substantially right angle to the coupling hole, the coupling tube configured to accept a second rod member therein; and a pair of flanges extending outwardly from the wall of the cylindrical portion at a location diametrically opposite to the coupling tube, the pair of flanges having a plurality of guiding faces forming a generally "U"-shaped opening therebetween to releasably grip a third rod member therebetween, each of the pair of flanges having a length in a direction parallel to the coupling hole greater than a diameter of the coupling tube.

2. The rod member connector of claim 1 wherein said coupling hole, said coupling tube, and said pair of outward flanges are integrally molded together.

3. The rod member connector of claim 1, wherein the connector is integrally molded from rubber.

4. The rod member connector of claim 1, wherein the connector is integrally molded from plastic.

5. The rod member connector of claim 1, wherein the first hole is disposed within said coupling tube and said second hole is disposed between said pair of flanges such that both the first and the second hole are in communication with said coupling hole.

6. The rod member connector of claim 1, further comprising a coating of glue on the connecting member in the coupling hole and the coupling tube for securing said first rod member and said second rod member in place.

7. The rod member connector of claim 1 wherein each of said outward flanges has a hooked outer edge.

8. The rod member connector of claim 1 wherein each of said outward flanges has a triangular cross-section and a smoothly curved inner side.

* * * * *